United States Patent [19]
Clark

[11] Patent Number: 6,081,791
[45] Date of Patent: Jun. 27, 2000

[54] ENHANCED ATM FOR FACILITATING TELEPHONY ACCESS

[75] Inventor: Theresa A. Clark, Superior, Colo.

[73] Assignees: U S WEST, Inc, Denver; MediaOne Group, Inc, Englewood, both of Colo.

[21] Appl. No.: 08/997,244

[22] Filed: Dec. 23, 1997

[51] Int. Cl.$^7$ ................................................ G06F 17/60
[52] U.S. Cl. .............................................. 705/43; 705/39
[58] Field of Search ........................... 705/43, 39; 902/8; 379/111, 112, 114, 115

[56] References Cited

U.S. PATENT DOCUMENTS

| | | | |
|---|---|---|---|
| 5,577,109 | 11/1996 | Stimson et al. .......................... | 379/112 |
| 5,650,604 | 7/1997 | Marcous et al. ......................... | 235/379 |
| 5,661,284 | 8/1997 | Freeman et al. ......................... | 235/380 |
| 5,663,546 | 9/1997 | Cucinotta et al. ....................... | 235/379 |
| 5,673,306 | 9/1997 | Amadon et al. .......................... | 379/59 |
| 5,677,945 | 10/1997 | Mullins et al. .............................. | 379/91 |
| 5,677,955 | 10/1997 | Doggett et al. ............................ | 380/24 |
| 5,679,943 | 10/1997 | Schultz et al. ........................ | 235/472 |
| 5,815,561 | 9/1998 | Nguyen et al. .......................... | 379/115 |
| 5,897,625 | 4/1999 | Gustin et al. ............................. | 705/43 |

*Primary Examiner*—Allen R. MacDonald
*Assistant Examiner*—Penny Caudle
*Attorney, Agent, or Firm*—Holme, Roberts & Owen

[57] ABSTRACT

An improved, automated teller machine (ATM) for enhanced telephony access is provided. The ATM provides for conventional financial transactions with financial institutions as well as the purchase of prepaid calling cards for telephony services. In the latter regard, the improved ATM is operable to receive a prepaid calling card purchase transaction request input by a customer and to transmit a message to a transaction service network for authorization of such transaction. Pursuant to authorization, the ATM is operable to automatically initiate a call to a telephony network to establish a prepaid calling card account. In particular, the ATM is operable to call a predetermined station number corresponding with a prepaid calling card service provider. Such predetermined number may correspond with an AIN-capable switch that allows the ATM to interface with a service control point maintained by the prepaid calling card service provider within the telephony network.

17 Claims, 3 Drawing Sheets

ENHANCED ATM FOR FACILITATING TELEPHONY ACCESS

FIELD OF THE INVENTION

The present invention relates to the field of automated teller machines, and more particularly, to an enhanced automated teller machine having increased functionality to facilitate telephony service access.

BACKGROUND OF THE INVENTION

The use of automated teller machines ("ATMs") to conduct financial transactions continues to increase. ATMs are employed to not only dispense cash on debit/credit account basis, but may also be employed to make deposits, loan payments, and transfers to/from/between accounts maintained by a user at a financial institution. Such range of options allow customers to conduct many traditional "banking" activities at all hours of the day and at numerous dispersed locations, thereby enhancing convenience and accommodating a variety of life styles.

Analogously, the ever-increasing range of telephony service options has provided telephony service consumers with increased convenience and functionality in communicating with others. By way of example, telephony-related service developments have included call forwarding, call screening, caller identification, and a variety of other services that satisfy both business and personal time-saving and mobility objectives.

As will be appreciated, however, the ability to realize increased telephony service benefits is limited when a user's access is restricted to public telephones and/or when a user is otherwise not able to conveniently incur telephony services charges in connection with calls initiated at third-party premises. To help address such instances, telephony-related service providers now offer prepaid calling cards which may be utilized, for example, to conduct long-distance calling from virtually any telephone.

In use, the holder of a prepaid calling card typically calls a predetermined telephone number corresponding with a specific telephony-related service provider, enters an account number indicated on the face of the calling card, then dials a telephone number of the user's choice, wherein corresponding telephony service is provided to the extent that incurrable charges have been prepaid. In the latter regard, the account number indicated on a calling card typically corresponds with a certain amount of prepaid telephone service access, such amount being accounted for and reduced on an ongoing basis at a telephony network service node corresponding with the predetermined telephone number called to utilize the card. Upon exhausting a prepaid access amount, the corresponding call card cannot be further utilized for telephony access. As such, prepaid calling card users may often carry several prepaid calling cards and will, in any case, be faced with at some point the recurrent need to obtain additional prepaid calling cards.

SUMMARY OF THE INVENTION

In view of the foregoing, a primary objective of the present invention is to enhance access to telephony services via the use of prepaid calling cards. More particularly, an objective of the present invention is to enhance telephony service access by facilitating the purchase of prepaid calling cards.

In addressing the above-noted objectives, the present inventor has recognized the benefit of providing an improved ATM that allows a user to purchase prepaid calling cards via a debit/credit transaction with a financial institution with respect to which the user has a preestablished ATM debit and/or credit relationship. More particularly, the present invention may be embodied in a multi-function, ATM that includes a user input interface for receiving user instructions, such instructions including the input of a user's personal identification number. Additionally, the ATM comprises a function select interface for prompting/initiating selection of at least the following functions: (i) a financial transaction (i.e. withdrawal, transfer, deposit, account balance inquiry, etc.) with a financial institution; and (ii) a purchase transaction for a prepaid telephony service calling card utilizing the user's debit/credit account. Of particular note, the ATM includes a telephony calling switch for transmitting a preauthorized, prepaid calling card request call to a calling card service control point in a telephony network (e.g., maintained by a prepaid calling card telephony service provider), and for receiving a response to the request that includes at least a calling card account number. The amount of authorized calling services (e.g., in currency units) is also transmitted to the service control point for entry into a database that comprises various information on a calling card account number-specific basis.

The ATM comprises a device for imprinting account number information on inventoried, prepaid calling cards, and a dispenser for dispensing prepaid calling cards pursuant an ATM purchase transaction. The ATM may also include a communications switch for interface communications with a transaction services network. Such interface may be utilized to complete customary ATM-driven financial transactions with financial institutions (e.g., debit and credit institutions). In the present invention such interface may be further employed to obtain transaction authorization for the above-described purchase of prepaid calling cards.

Additional aspects and advantages of the present invention will become apparent upon consideration of the description that follows.

DETAILED DESCRIPTION

Figure 1:
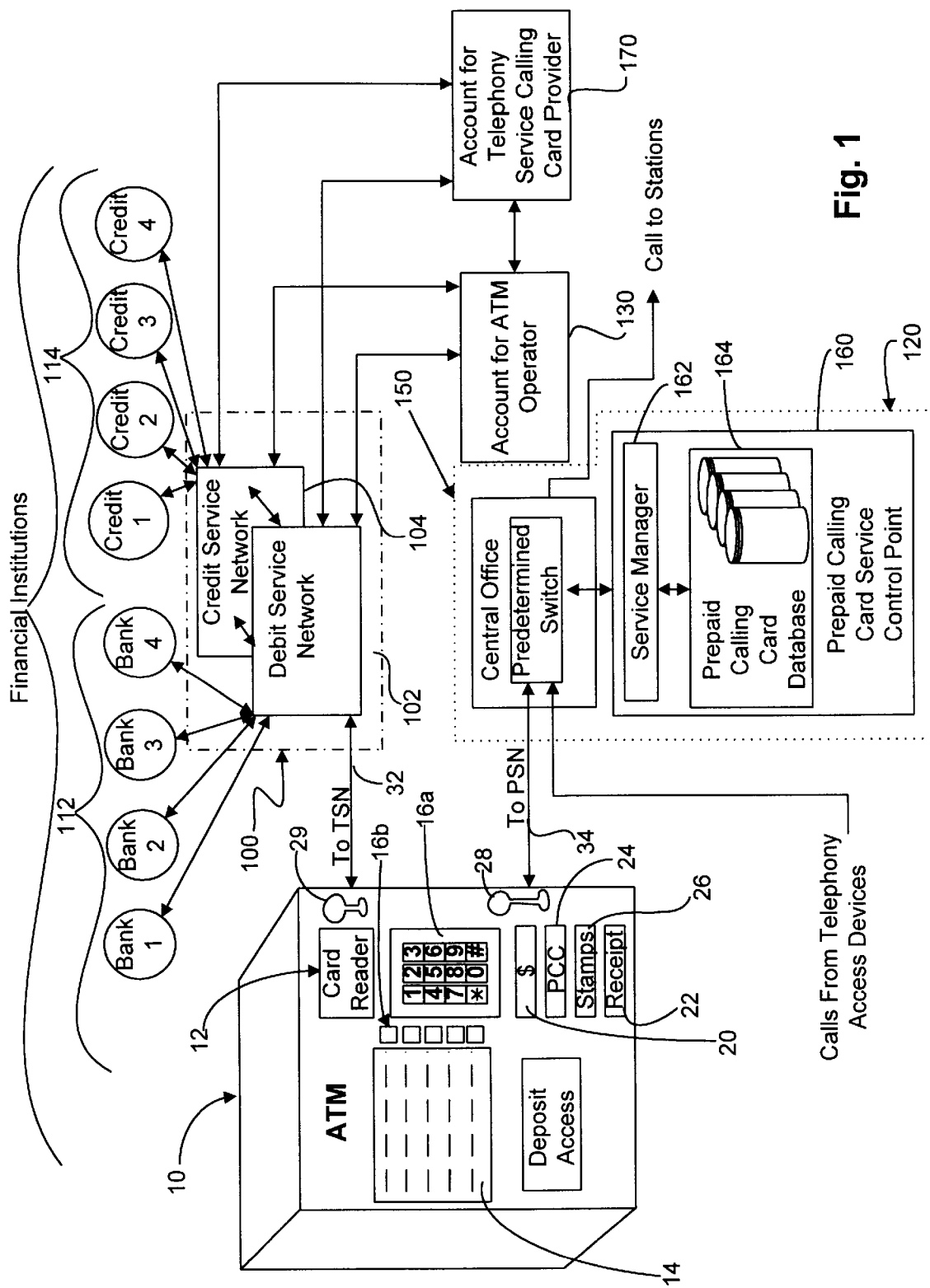
FIG. 1 illustrates a telephony system embodiment of the present invention.

The telephony system embodiment illustrated in FIG. 1 comprises an exemplary, automated teller machine ATM 10 having separate communication lines 22 and 24 for communications with a transaction services network 100 (TSN) and public switching telephony network 120 (PSN), respectively. As will be appreciated, numerous ATMs may implement the features of ATM 10 and interface with TSN 100 and PSN 120 in actual implementation.

The ATM 10 comprises a card reader 12 for reading encoded information from a magnetic strip or other storage mechanism on a debit/credit card inserted by a user. By way of example, the information read from the debit or credit card may include a personal identification number (i.e., PIN #) issued to the cardholder by a financial institution with respect to which the user has a debit and/or credit relationship, an account number at the financial institution, and an identifier for the financial institution. The ATM 10 further includes a user LED display interface 14 for prompting a user for the input of instructions and/or for otherwise conveying information to a user. A user input pad 16a is provided to receive input instructions and other information from a user. User push-buttons 16b may also be provided for instruction input, such push-buttons being positioned in corresponding spatial relation to the display lines presented on LED display 14. As will be further described, user inputs 16a and 16b may be employed in the present invention for the input of PIN #s, instruction to complete financial transactions with a debit/credit institution and instructions for the purchase of prepaid telephony service calling cards, and optionally, for the purchase of postage stamps. While not shown, ATM 10 comprises a processor preprogrammed to control/coordinate the functions of the ATM components, as well as communications to/from the TSN 100 and PSN 120.

The ATM also includes a plurality of dispenser slots, including a dispenser slot 20 for dispensing currency to a user and a dispenser slot 22 for outputting a transaction receipt to a user. Of particular importance, a dispenser slot 24 is also provided for dispensing a prepaid telephony services calling card in conjunction with ATM operations. An optional dispenser slot 26 may also be included for dispensing postal stamps purchased pursuant to ATM operations. Finally, the ATM 10 may also include a deposit access assembly 18 for receiving a deposit envelope from a user.

As indicated, communications line 32 provides for the output/input of messages from ATM 10 (e.g. via a communications transceiver 29) to/from a transaction services network 100. Transaction services network (TSN) 100 may comprise debit and credit service networks 102 and 104, respectively. The debit service network 102 is interconnected with a plurality of banking institutions 112 for authorizing financial transactions at ATM 10. Similarly, the credit service network 104 is interconnected with a plurality of credit providers 114 for authorization of credit transactions at ATM 10. For any given transaction at ATM 10, the transaction services network 100 will operate to convey/receive messages to/from a particular banking or credit institution 112 or 114 corresponding with the particular ATM card inserted at the ATM 10 by a user. For purposes hereof, the banking institutions 112 and credit institutions 114 that may be interconnected with the debit service network 102 and credit service network 104, respectively, will be collectively referred to herein as financial institutions.

For transactions involving the output of currency at ATM 10 or the authorization for the transfer of funds to a third-party (e.g., pursuant to the purchase of a prepaid calling card), the ATM 10 is operable to interface with the TSN 100 to obtain authorization for the specific transaction desired, whereupon debit or credit transaction authorization information is provided to the ATM from the TSN 100. Such transaction authorization information is storable at the ATM 10. At the end of a predetermined period (e.g., end of each day), the ATM may be preprogrammed to transmit settlement requests to the TSN 100, pursuant to which funds will be transferred from the financial institutions corresponding with each transaction authorized during the period to a designated account (e.g., interfacing with the TSN 100), including in particular, an account for the ATM operator 130 or for a telephony prepaid calling card service provider 140.

Communication line 34 interconnects the ATM 10 with a telephony public switching network 120. More particularly, the ATM 10 comprises a communication transceiver 28 (e.g., telephony calling switch) for initiating calls on communications line 34 to the PSN 120. Calling device 28 may be controlled by the aforementioned processor at ATM 10 so as to dial a predetermined telephone number corresponding with a prepaid calling card service provider upon authorization from TSN 100 of a corresponding, prepaid calling card transaction initiated by a user at the ATM 10.

In this regard, the PSN 120 comprises a central office 150 for receiving calls from ATM 10. While a single central office 150 is illustrated in FIG. 1, the telephony service network 120 may comprise a number of central offices that interface with different ATMs in corresponding, different geographic regions in actual implementation of the present invention. By way of example, the telephony service network may include a central office for receiving calls initiated from ATMs within a first geographic region, another central office for receiving calls initiated from ATMs within a second geographic region, and so on.

The central office 150 shown in FIG. 1 includes a plurality of telephony call switching devices, including at least one predetermined switch 152 for receiving calls from ATM 10, i.e., for handling requests for prepaid calling cards initiated at ATM 10. Such predetermined service switch 22 corresponds with the predetermined telephone number dialable by transceiver 28 at ATM 10, and as noted, corresponds with a predetermined prepaid calling card service provider. The switch 152, may advantageously comprise AIN (Advanced Intelligent Network) switching capabilities.

In the embodiment illustrated in FIG. 1, predetermined service switch 152 is an AIN switch wherein, upon receipt of a call from ATM 10 the predetermined switch 152 is operable to suspend call processing and launch a message to a prepaid calling card service control point 160 maintained with telephony network 120. The service control point 160 comprises a service manager 162 and prepaid calling card database 164. In general, service control point 160 is capable of interfacing with ATM 10 so as (i) to receive prepaid calling card requests, (ii) to establish prepaid calling card accounts having corresponding account numbers and corresponding, prepaid telephony access units associated therewith, and (iii) to provide prepaid calling card account numbers to the ATM 10. As will be appreciated, service control point 160 may be software-driven with preprogrammed instructions for creating prepaid calling card accounts.

Figure 2A:
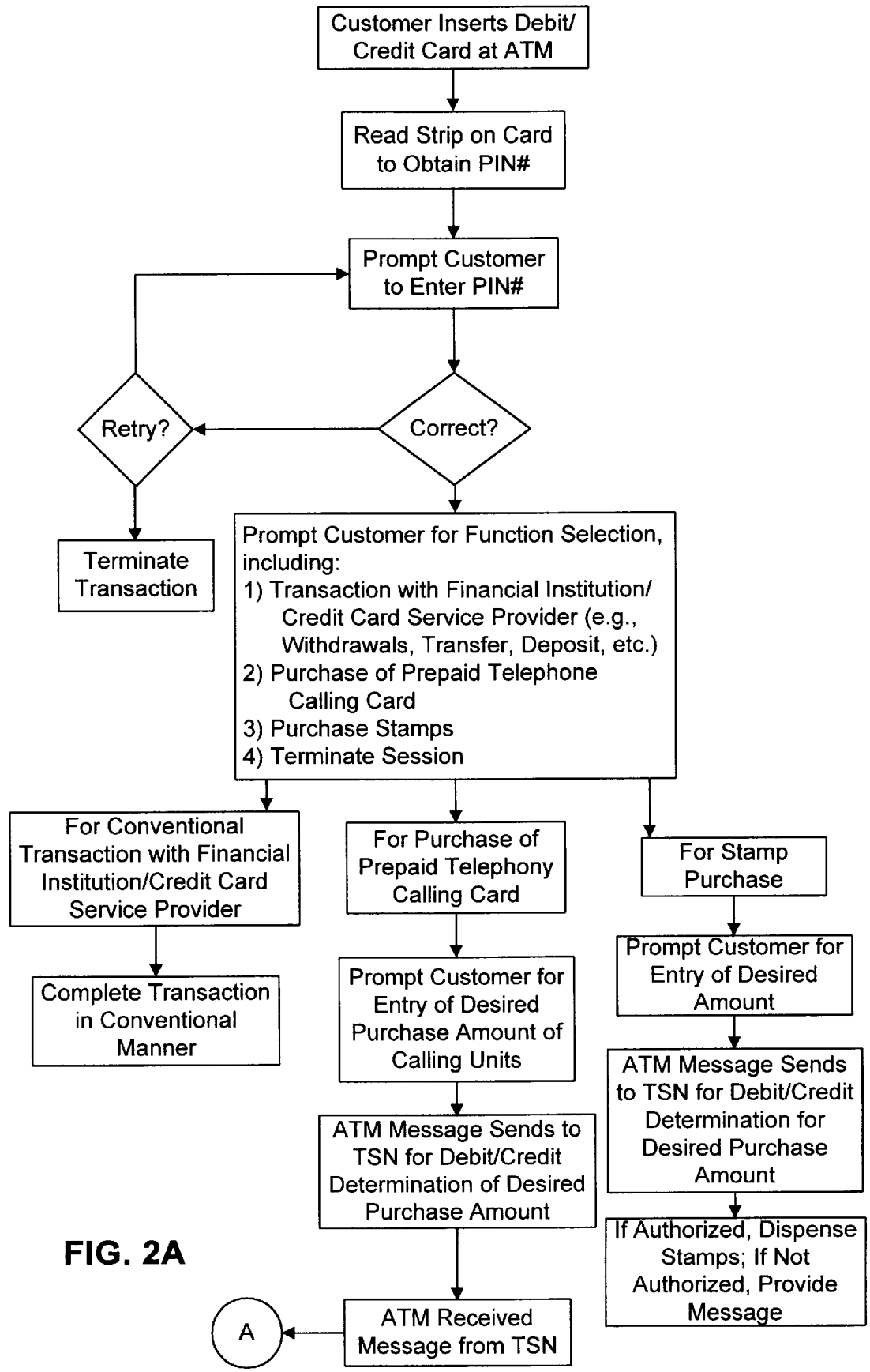
FIGS. 2A and 2B illustrate a process flow diagram for one embodiment of the present invention.
Figure 2B:
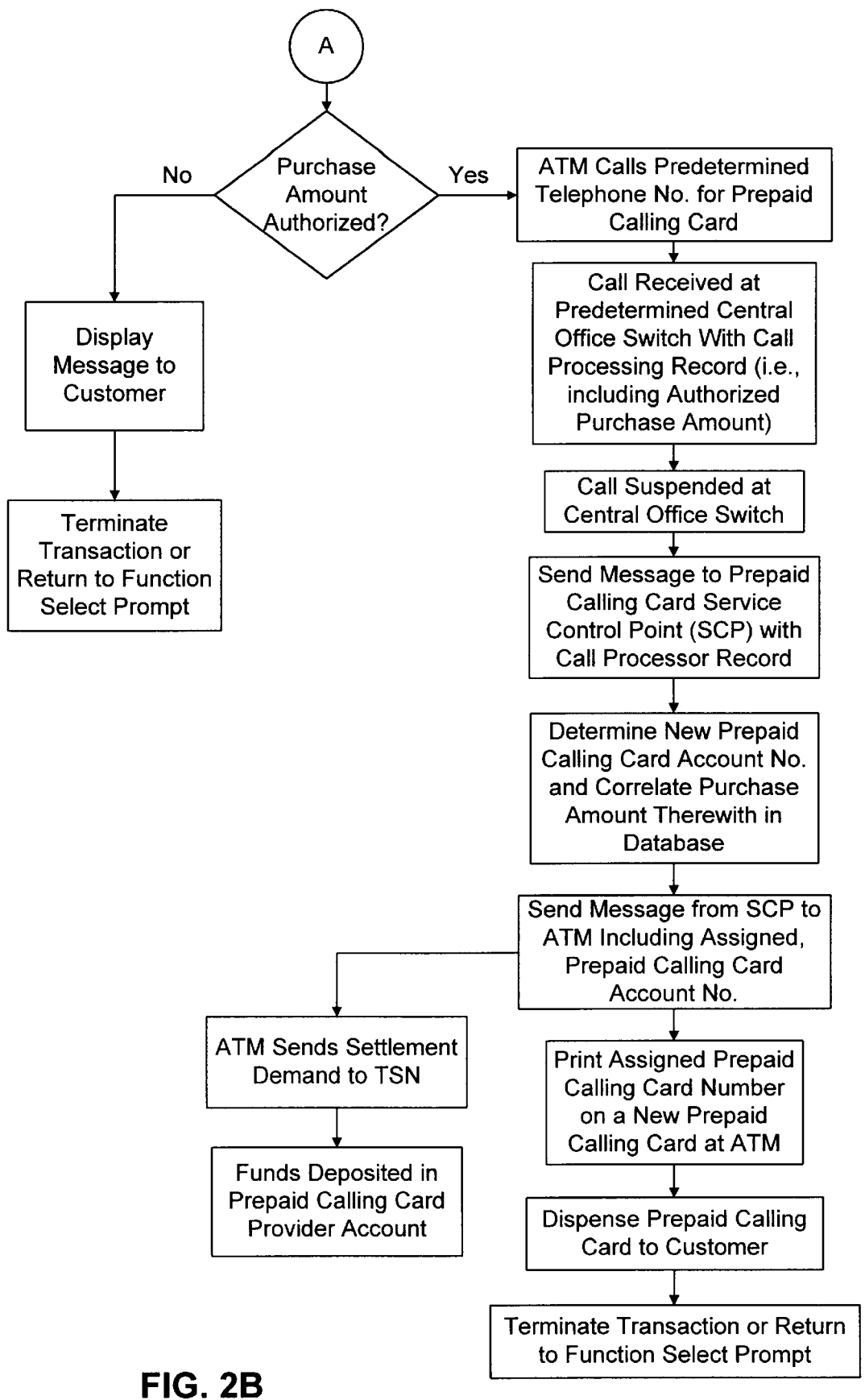

Operation of the system embodiment illustrated in FIG. 1 will now be explained with reference to the process flow illustrations of FIGS. 2A and 2B. In particular, a customer initially inserts a debit or credit card into the card reader 12 at the ATM 10. In response, the card reader 12 reads encoded information from the debit/credit card (i.e., a "correct" PIN #, an account number, and a financial institution identifier). Thereafter, the ATM 10 prompts the customer on LED display 14 to enter a PIN # utilizing user input pad 16a. Upon entry of a PIN #, the ATM 10 then determines if the PIN # entered corresponds with the PIN # read from the debit/credit card. If not, the ATM 10 may display a message on LED interface 14 indicating that an incorrect number was entered and may reprompt the customer to reenter the correct PIN #. Alternatively, or alter a given predetermined number of unsuccessful re-entry attempts, the ATM 10 may terminate the transaction, and optionally may retain the debit/credit card.

If the appropriate PIN # is inputted by the customer, ATM 10 is then operable to prompt a customer via interface 14 to select a desired function (e.g., utilizing input devices 16a or 16b). In this regard, LED display 14 may provide the customer with a menu of function selections, including:

1) financial transaction with a financial institution (i.e., for funds withdrawal/advancement, transfer of funds from one account to another account, deposit of funds to an account, account status inquiry).
2) purchase transaction to obtain a prepaid telephone calling card.

3) purchase transaction to obtain postage stamps.

4) termination of the transaction.

In the event the user selects a financial transaction corresponding with item 1 noted above, the ATM 10 will then display additional menus, e.g., for the user to specify the particular account(s) (e.g., savings or checking), denomination(s), etc, for the desired transaction in a conventional manner. The ATM 10 will then automatically launch a transaction request message via line 32 to the transaction services network 100 for processing in a conventional manner.

In the event that the customer selects a purchase transaction as per items 2 or 3 noted above, the ATM 10 is operable to prompt the customer as to the amount of prepaid telephone calling card units (e.g., in a currency denomination) desired and/or the amount of postage stamps desired (e.g., in a total currency denomination). Upon entry of the desired amount by the customer, the ATM 10 will then launch a purchase transaction authorization request to the transaction services network. In particular, a transaction record will be transmitted to financial institutions within the debit or credit network 102 and 104, respectively, corresponding with the debit or credit card utilized by the customer at the ATM 10. The transaction record may include at least a financial institution identifier, a customer account number and a desired purchase transaction amount. The transaction service network 100 will then respond to the transaction request after inquiry with the appropriate bank 112 or credit provider 114. In particular, such requests may be either authorized or denied. In the event the requested purchase transaction is denied, ATM 10 may communicate an appropriate message to the customer via LED display 14 and return to a function selection menu noted above.

In the event that the purchase transaction is authorized, a transaction record will be returned by the transaction services network, including an authorization number. Such authorization number may be stored at ATM 10 for subsequent settlement purposes. For prepaid calling card purchase transactions, the processor within ATM 10 may then automatically cause calling device 28 to call the predetermined number corresponding with the predetermined switch 152 at the central office 150. Upon receipt of such call at the central office switch 152 (e.g., an AIN-capable switch), call processing will be suspended and a message will be sent to the prepaid calling card service control point 160. Such message may include the denomination of prepaid calling card services authorized for the particular transaction and the authorization number. In response, the service manager 162 will consult database 164 to obtain a prepaid calling card account number and to designate for such account, the corresponding amount of prepaid calling card services purchased. The corresponding transaction authorization number may also be stored at database 164. The assigned prepaid calling card account number will then be communicated to ATM 10 via a message transmitted from the service manager 162.

In conjunction with transaction processing, ATM 10 may also provide to the service control point 160 the PIN # corresponding with the debit/credit card employed at the ATM 10 for the transaction. Such PIN # may then be logged by service manager 162 in the database entry corresponding with the assigned, prepaid calling card account number transaction. Such PIN # may then be retrieved for use in processing subsequent prepaid calling card telephony service access calls (e.g., wherever charges are debited against the corresponding prepaid calling card account until the account is exhausted). Alternatively, the ATM 10 may be preprogrammed so as to prompt the customer to enter a separate PIN # desired for prepaid calling card usage. In such instances, the separate PIN # inputted by the customer will then be transmitted via a message from the ATM 10 to the prepaid calling card service control point 160 for registration in database 164 in corresponding relation to the prepaid calling card account number. In another arrangement, ATM 10 may be preprogrammed to provide a customer with an option to have a PIN # automatically selected for a given prepaid calling card purchased at ATM 10. In such an arrangement, service control point 160 may assign the PIN # and communicate the same to a customer at ATM 10 in connection with dispensation of a prepaid calling card.

As indicated hereinabove, for each purchase transaction, the ATM 10 will receive a prepaid calling card account number message from the prepaid calling card service control point 160. After the transmission of such account number, prepaid calling card service control point 160 may transmit a message to predetermined switch 162 to terminate the call. Correspondingly, ATM 10 will utilize the prepaid calling card account number provided by the prepaid calling card service control point 160 to imprint a prepaid calling card from an inventory of cards stored at the ATM 10. That is, the ATM 10 may be provided with an inventory of "blank" prepaid calling cards and may imprint different account numbers thereupon in connection with each given prepaid calling card transaction. After imprinting, ATM 10 may then dispense the prepaid calling card via slot dispenser 24 to the customer. Thereafter, ATM 10 may return to the function selection prompt noted hereinabove to allow the customer to conduct additional transactions at ATM 10 and/or to terminate the transaction.

The embodiment description provided above is for purposes of illustration only. The various aspects and features of the present invention can be applied in a variety of other embodiments. Such embodiments are intended to be within the scope of the present invention as defined by the claims which follow.

What is claimed is:

1. A multi-function automated teller machine, comprising:

a user input interface for receiving user input;

a function prompt interface for prompting a user to select at least one function from the following function set:

a purchase transaction for a prepaid telephony service calling card;

a financial transaction with a financial institution, separate from said purchase transaction function; and a dispenser for dispensing a prepaid telephony service calling card to a user pursuant to authorization of a user's selection of said purchase transaction function;

a first transceiver for transmitting an authorization request to a transaction services network, pursuant to a user's selection of said purchase transaction function, and for receiving in authorization response from said transaction services network; and a second transceiver is operable to receive at least one message from said service control point in a telephone network, said at least one message comprising data corresponding with a prepaid calling card account number.

2. A multi-function automated teller machine as claimed in claim 1, wherein said authorization request includes data identifying a particular financial institution, a user's account at said financial institution, and a purchase amount input by a user.

3. A multi-function automated teller machine as claimed in claim 1, wherein said second transceiver is operable to transmit said prepaid calling card request only pursuant to receipt at said first transceiver of an approved authorization response from said transaction services network.

4. A multi-function automated teller machine as claimed in claim 3, wherein said approved authorization response comprises data corresponding with a transaction authorization number.

5. A multi-function automated teller machine as claimed in claim 1, further comprising:

an imprinter for imprinting said prepaid calling card account number on said prepaid telephony service calling card.

6. A multi-function automated teller machine as claimed in claim 1, wherein said function set further comprises:

a purchase transaction for postage stamps; and wherein the multi-function automated teller machine further comprises:

a device for dispensing postage stamps.

7. A method for use in the distribution of prepaid telephony service calling cards comprising:

receiving input at an automated teller machine, said input corresponding with a requested purchase transaction for a prepaid telephony service calling card;

first transmitting a transaction authorization request from a first transceiver in said automated teller machine to a transaction services network responsive to said input;

second transmitting from a second transceiver in said automated teller machine a prepaid calling card request to a predetermined service control point in a telephony service network responsive to receipt of approval of said transaction authorization request at said first transceiver;

dispensing a prepaid telephony service calling card from said automated teller machine responsive to receipt of prepaid calling card account information by said second transceiver from said service control point.

8. A method as claimed in claim 7, wherein said calling card account information includes a prepaid calling card number, and wherein said method further comprises:

imprinting said prepaid calling card number on said prepaid telephony service calling card at said automated teller machine prior to said dispensing step.

9. A method as claimed in claim 7, wherein said input comprises a desired prepaid telephony service card calling amount, and wherein said transaction authorization request includes said amount.

10. A method as claimed in claim 9, wherein said approval comprises a transaction authorization number, and wherein said method further comprises:

storing said transaction authorization number in corresponding relation to a completed prepaid calling card purchase transaction.

11. A method as claimed in claim 9, wherein said transaction services network comprises a plurality of banking and credit institutions.

12. A method as claimed in claim 9, wherein said prepaid calling card request comprises said desired prepaid telephony service calling card amount.

13. A method as claimed in claim 12, said method further comprising:

storing said desired prepaid telephony service calling card amount in corresponding relation to said prepaid calling card account information at said service control point.

14. A method as claimed in claim 13, wherein said prepaid calling card request further comprises a personal identification number included with said input, and wherein said method further comprises:

storing said personal identification number in corresponding relation with said prepaid calling card account information at said service control point.

15. A method as claimed in claim 7, said second transmitting step including:

initiating a telephony call to a predetermined station number corresponding with said service control point.

16. A method as claimed in claim 15, said method further comprising: suspending said telephony call at an AIN-capable switch within said telephony service network.

17. A method as claimed in claim 16, said method further comprising:

processing said suspended call in accordance with pre-programmed instructions.

\* \* \* \* \*